US009824593B1

(12) United States Patent
Kronfeld et al.

(10) Patent No.: US 9,824,593 B1
(45) Date of Patent: Nov. 21, 2017

(54) SYSTEM AND METHOD FOR HOLISTIC FLIGHT AND ROUTE MANAGEMENT

(71) Applicant: Rockwell Collins, Inc., Cedar Rapids, IA (US)

(72) Inventors: Kevin M. Kronfeld, Cedar Rapids, IA (US); Kevin Delaney, Cedar Rapids, IA (US); Scott J. Zogg, Cedar Rapids, IA (US); James P. Mitchell, Cedar Rapids, IA (US); Jennifer A. Davis, Cedar Rapids, IA (US); Geoffrey A. Shapiro, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/860,058

(22) Filed: Sep. 21, 2015

(51) Int. Cl.
G08G 5/00 (2006.01)

(52) U.S. Cl.
CPC ......... *G08G 5/0043* (2013.01); *G08G 5/0008* (2013.01); *G08G 5/0013* (2013.01); *G08G 5/0039* (2013.01)

(58) Field of Classification Search
None
See application file for complete search history.

(56) References Cited

U.S. PATENT DOCUMENTS 5,025,382 A * 6/1991 Artz ..................... G06F 3/033
340/945
5,593,114 A 1/1997 Ruhl
5,978,715 A 11/1999 Briffe et al.
6,112,141 A 8/2000 Briffe et al.
6,199,008 B1 3/2001 Aratow et al.
6,529,706 B1 3/2003 Mitchell
6,741,841 B1 5/2004 Mitchell
6,975,600 B1 12/2005 Vaughan et al.
8,712,321 B1 4/2014 Dankberg
2001/0003809 A1 6/2001 Hayashi et al.
(Continued)

OTHER PUBLICATIONS

John Croft, New Flight Deck Apps Help Pilots Avoid Turbulence, Aviation Week & Space Technology, Sep. 15, 2015, 4 pages, Found online at <http://aviationweek.com/ArticlesStory/ArticlesPrint.aspx?id=df0fa5f5-26a3-4741-b59c-9c526cd3c024&p=1&printView=true>.

*Primary Examiner* — Rodney Butler
*Assistant Examiner* — Tamara Weber
(74) *Attorney, Agent, or Firm* — Angel N. Gerdzhikov; Donna P. Suchy; Daniel M. Barbieri

(57) ABSTRACT

A distributed system for flight and route management (FARM) of one or more aircraft of the system may include onboard processing devices for combining sensor data local to an aircraft with cloud-based data received through the system from other aircraft or from ground-based processing devices, thereby generating situation models of each aircraft relative to its flight path and in the context of current and predictive conditions (weather, traffic, terrain, threats, etc.). The FARM system may evaluate situation models against prioritized constraint sets of business rules or policies associated with each aircraft's flight plan to determine, cross-check, and implement possible modifications to the flight plan. Localized aircraft data and flight plan modifications may be propagated through the system via a variety of communications networks to provide synchronized, holistic airspace data portraits to aircraft and ground control alike.

20 Claims, 6 Drawing Sheets

(56) References Cited

U.S. PATENT DOCUMENTS

| | | |
|---|---|---|
| 2004/0183695 A1 | 9/2004 | Ruokangas et al. |
| 2005/0024236 A1 | 2/2005 | Gosdin et al. |
| 2007/0198143 A1 | 8/2007 | Ybarra et al. |
| 2008/0025561 A1 | 1/2008 | Rhoads et al. |
| 2009/0088972 A1 | 4/2009 | Bushnell |
| 2010/0035607 A1 | 2/2010 | Horr et al. |
| 2010/0042445 A1* | 2/2010 | Nicosia ............. G06F 17/30017 705/7.15 |
| 2010/0168939 A1 | 7/2010 | Doeppner et al. |
| 2013/0018532 A1* | 1/2013 | Segal .................... B64C 39/024 701/3 |
| 2013/0315125 A1 | 11/2013 | Ravishankar et al. |
| 2015/0199906 A1* | 7/2015 | Judy ...................... G08G 5/003 701/3 |
| 2015/0310747 A1* | 10/2015 | Frolik ................... B64D 45/00 340/971 |
| 2016/0275801 A1* | 9/2016 | Kopardekar ......... G08G 5/0043 |

\* cited by examiner

US 9,824,593 B1

SYSTEM AND METHOD FOR HOLISTIC FLIGHT AND ROUTE MANAGEMENT

CROSS-REFERENCE TO RELATED APPLICATIONS

The present application is related to U.S. patent application Ser. No. 13/928,061, filed Jun. 26, 2013. Said U.S. patent application Ser. No. 13/928,061 is herein incorporated by reference in its entirety.

TECHNICAL FIELD

The inventive concepts disclosed herein relate generally to, and more particularly to avionics systems, and more particularly to distributed systems for managing the concurrent flights of multiple aircraft.

BACKGROUND

Existing flight and route management (FARM) systems are limited in scope with respect to their input data as well as their priorities. For example, a FARM system may take into account only static weather and traffic data, localized for the immediate physical and temporal vicinity of a single aircraft, as opposed to predictive weather and traffic information. The routing priorities of such a system may be similarly limited, recommending a route that minimizes flight distance or fuel consumption while avoiding obvious threats. It may therefore be desirable to provide flight and route management via a distributed system that combines onboard and ground-based processing to provide synchronized situational awareness to ground control and to multiple aircraft flying multiple routes, including real-time and predictive awareness of weather and atmospheric conditions that may develop and change position or size over time. It may additionally be desirable to provide a system for flight and route management that can dynamically prioritize aircraft routing based on new and diverse constraints, such as passenger comfort, customized business rules, or specific mission objectives.

SUMMARY

In one aspect, embodiments of the inventive concepts disclosed herein are directed to a flight and route management (FARM) system incorporating at least one portable FARM device for onboard processing. For example, the onboard FARM device may include a display screen and a transceiver connectable to at least one communications/IP network. The onboard FARM device may include a memory or data storage unit for storing flight plans and ordered constraint sets outlining the customized routing priorities to be enforced during a given flight plan. The onboard FARM device may include a situation modeler that receives position information from the aircraft position sensors and other information such as weather and traffic data from external sources through the communications networks. The situation modeler may generate situation models corresponding to the current status of the aircraft relative to its flight plan and to both localized and ground-based data patterns. The situation modeler may evaluate each situation model in light of the ordered constraint sets associated with its flight plan. The onboard FARM device may include a rerouter that generates potential modifications to the flight plan (e.g., changes in flightpath, destination, altitude for a given flight segment) and rationales clearly explaining the reasoning behind any potential modification for display to the pilot or crew via the display unit.

In a further aspect, the inventive concepts disclosed herein are directed to a distributed system for flight and route management including an onboard FARM device associated with each of a network of aircraft and one or more ground-based FARM devices. Ground-based FARM devices may include a more powerful situation modeler that generates flight plans and ordered constraint sets for multiple aircraft associated with a ground control facility with which the ground-based FARM device is associated. Ground-based situation modelers may crosscheck and approve multiple flight plan modifications and propagate localized data from multiple aircraft throughout the system. Ground-based situation modelers may modify flight plans by revising the ordered constraint set associated with a flight plan or by generating and evaluating a situation model associated with a given flight plan. Ground-based FARM devices may include rerouters for generating flight plan modifications and rationales based on evaluations of the situation models.

In a still further aspect, the inventive concepts disclosed herein are directed to a method for flight and route management via a distributed system of onboard and ground-based FARM devices. For example, the method may include: receiving, via an onboard device of the system, a first ordered constraint set and a flight plan. The method may include receiving, via the onboard FARM device, position, weather, or other data local to the aircraft. The method may include receiving, via the onboard FARM device, cloud-based data from a ground-based FARM device or from a FARM device onboard a second aircraft via at least one communications/IP network.

The method may include generating, via the onboard FARM device or a ground-based FARM device, a situation model based on a fusion of localized and cloud-based data with the flight plan. The method may include generating, via an onboard or ground-based FARM device, a modification to the flight plan and a rationale for the modification by applying the relevant ordered constraint set to the current situation model. The method may involve crosschecking modifications via a ground-based FARM device and implementing approved modifications manually or via the aircraft avionics.

BRIEF DESCRIPTION OF THE DRAWINGS

The inventive concepts disclosed herein may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the inventive concepts with further detail. It is to be understood that both the foregoing general description and the following detailed description are exemplary and explanatory only and are not necessarily restrictive of the inventive concepts disclosed and claimed herein. These drawings depict only exemplary embodiments of the inventive concepts, and should not be considered to limit their scope in any way.

Figure 1A:
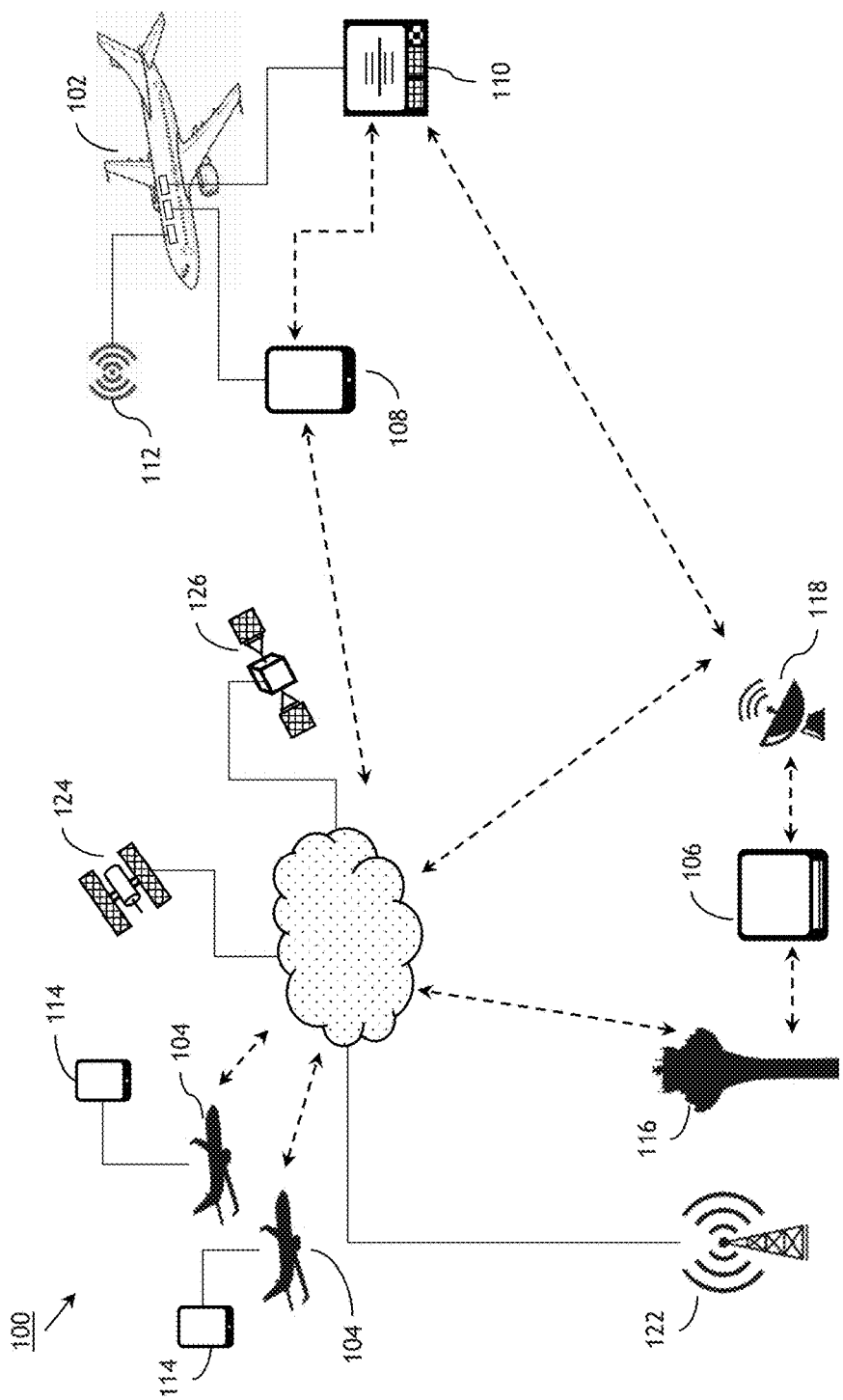
FIG. 1A is an environmental diagram of a flight and route management (FARM) system according to embodiments of the inventive concepts disclosed herein.

Referring to FIG. 1A, a flight and route management (FARM) system 100 may be distributed between ground-based FARM devices and portable FARM devices onboard one or more aircraft 102, 104. The FARM system 100 may include a ground-based FARM device 106 that generates a flight plan and an ordered set of constraints for an aircraft 102. A "flight plan" may include, but is not limited to, a route determined via IFR waypoint navigation as well as other navigational sources such as VFR rules and operation. The aircraft 102 may then, via an onboard FARM device 108, continually assess its progress relative to the flight plan based on weather data local to, and collected by, the aircraft 102 as well as weather and traffic data (which may include both real-time data and predictive models) based on information local to other aircraft 104, whose flight plans may intersect with or approach the flight plan of the aircraft 102 at different points in time.

The FARM system 100 may include an onboard FARM device 108 which provides access to the FARM system 100 to the pilots and crew of the aircraft 102. The onboard FARM device 108 may be a tablet or similar portable processing device capable of connecting (e.g., via wire/hard connection to an existing communications system or wirelessly) to the flight management system (FMS) and other avionics components 110 and sensors 112 onboard the aircraft 102. A ground-based FARM device 106 or an onboard FARM device 108 may incorporate smart display systems, cabin terminals, or other similar types of portable or fixed hardware. Similar onboard FARM devices 114 may likewise provide access to the FARM system 100 to other aircraft 104 active in the airspace. The ground-based FARM devices 106 and onboard FARM devices 108, 114 within the FARM system 100 may share general structures and components, with the ground-based FARM devices 106 incorporating greater processing power and therefore broader capability to generate, monitor, or modify flight plans and constraint sets for multiple aircraft 102, 104. The ground-based FARM devices 106 may be linked to ground control resources 116 (e.g., traffic control and dispatch) from which the ground-based FARM devices 106 may access traffic information (e.g., ADS-B traffic service, ground movement control) and propagate that information to its network of aircraft 102, 104 via ground-to-air communications protocols 118 (e.g., AOC, ACARS). Each onboard FARM device 108 may include an RFID tag (not shown) or similar device for authenticating the onboard FARM device 108 to the FARM system 100.

The onboard FARM device 108 of the aircraft 102 may exchange information with ground-based FARM devices 106 (and by extension with the onboard FARM devices 114 aboard other aircraft 104) via one or more communications networks 120. Communications networks 120 used by the FARM system 100 may include air-to-ground (ATG) tower-based networks 122 (e.g., Gogo), geostationary satellite-based IP networks 124 (e.g., Inmarsat), and low earth orbit (LEO) satellite-based IP networks 126 (e.g., OneWeb). The FARM system 100 may utilize one or more of these communications networks 120 simultaneously to exchange information between an onboard FARM device 106 (onboard aircraft 102) and the ground-based FARM devices 106 throughout the segments of each flight, whether the aircraft is stationary, in motion, airborne, or on the ground. For example, U.S. Pat. No. 6,741,841 discloses a wireless airport gateway communications system that provides downlinked direct broadcast satellite (DBS) data and short-range high-speed radio/optical data links through the open door of an aircraft 102 parked at a terminal gate.

An onboard FARM device 108 of the FARM system 100 may receive data through more than one communications network 120 simultaneously. For example, referring also to FIG. 1B, the onboard FARM device 108 aboard aircraft 102 may include a transceiver including a transmitter 128 and one or more receivers 130 operating in various modes (e.g., DBS, $K_u$-band, ATG). The receivers 130 may include a first receiver 130a operating in a first mode, a second receiver 130b operating in a second mode, and additional receivers (not shown) operating in additional modes. The transmitter 128 and receivers 130 may transmit and receive data signals via external transmitting antennas 132 and receiving antennas 134 of the aircraft 102. A situation modeler 136 of the onboard FARM device 108 may store incoming data (e.g., flight plans or constraint sets generated by a ground-based FARM device 106) from the receivers 130 in a memory 138 or data storage unit of the onboard FARM device 108. The memory 138 may include a current navigational database, updated periodically or between flights by a ground-based FARM device 106.

A constraint set may be generated by the onboard FARM device 108 or by a ground-based situation modeler 140 of a ground-based FARM device 106. The size and weight considerations applicable to the onboard FARM device 108 may not apply to the ground-based FARM device 106, allowing the ground-based situation modeler 140 to generate and manage flight plans both for the aircraft 102 and for a network of additional aircraft 104. A constraint set may include a mission profile or mission objective, and a hierarchy of priorities based on the mission profile or mission objective. For example, the mission profile may include transporting one or more very important passengers (VIPs) to an important meeting. The associated constraint set may then prioritize comfort-related factors (e.g., avoiding turbulence while airborne, providing window-seat passengers with desirable views, low acceptable risk thresholds) over cost-related factors (e.g., minimizing flight time/distance, minimizing fuel consumption, higher acceptable risk levels). Other types of constraints may include: traffic control and flow management directives; weather hazards such as turbulence, wind patterns, or volcanic ash; business rules developed, imposed, and refined by individual carriers or governments depending on customer relations, budgetary/regulatory concerns, military requirements, or infrastructure considerations. For example, some flight paths may be arbitrarily defined as more desirable than others; alternate destinations or flight paths may be determined based on ground infrastructure capabilities at or near a destination or required time of arrival; in the alternative, pilot, crew, and staff availability may be prioritized. In some applications, a constraint set may distinguish between "hard" or absolute threat considerations which may preclude rerouting entirely, e.g., rough terrain, and "softer" or more temporary considerations such as a temporarily restricted airspace which may require military clearance for overflight. The situation modeler 136 of the onboard FARM device 108 may refer to the order in which comfort, cost, risk, and other factors are prioritized by the constraint set when generating or assessing a situation model to determine if the current flight plan should be modified.

The onboard FARM device 108 may include one or more display units 142 (ex.—display screens) for displaying information, alerts, or potential modifications to the flight plan to the pilot or crew of the aircraft 102. The onboard FARM device 108 may include an input device 144 for accepting manual input by the pilot or crew of the aircraft 102. For example, the input device 144 may include a customizable touchscreen of the onboard FARM device 108. The onboard FARM device 108 may directly connect (via wired or wireless connection) to the flight management system (FMS) and avionics components 110 of the aircraft 102. For example, the situation modeler 136 of the onboard FARM device 108 may generate a potential modification to the current flight plan of the aircraft 102. The FARM system 100 (via connection to the aircraft avionics 110 or the ground-based FARM device 106) may crosscheck and approve the potential modification. The modification may be displayed to the pilot/crew (via display unit 144) for manual implementation or the FARM system 100 may instruct the FMS and avionics 110 of the aircraft 102 to automatically execute the modification (e.g., via an autopilot or vertical navigation system of the aircraft 102). The situation modeler 136 may continually receive a current position of the aircraft 102 determined by one or more position sensors 112a of the aircraft 102. In embodiments where the onboard FARM device 108 is not directly connected to the aircraft 102, for example, aircraft position (or other localized aircraft data) may be continually determined via ADS-B feed and manually input into the onboard FARM device 108 (via the input device 144). Position sensors 112a may include absolute position sensors such as a GNSS receiver or inertial position sensors such as gyroscopes, compasses and accelerometers. The position sensors 112a may continually relay determined positions of the aircraft 102 to the situation modeler 136 for use in generating situation models corresponding to the changing position of the aircraft 102 along its flight path.

The situation modeler 136 may continually assess weather and atmospheric conditions local to the aircraft 102 via weather sensors 112b or other sensors aboard the aircraft 102. For example, weather sensors 112b may continually measure local atmospheric conditions, e.g., outside air temperature (OAT), wind speeds, turbulence, moisture content, barometric pressure, and relay this data to the situation modeler 136. In some embodiments, the situation modeler 136 may continually relay localized weather data to the nearest ground-based FARM device 106 of the FARM system 100.

The onboard FARM device 108 may include a rerouter 146. The rerouter 146 may generate specific modifications to the flight plan if the evaluations of situation models generated by the situation modeler 136 suggest that a modification is in order. The rerouter may include a model flight management system (MFMS) 146a, which may copy or model the FMS of the aircraft avionics 110. For example, the rerouter 146 may generate a new route corresponding to a flight segment of the aircraft 102 that avoids an identified obstacle or developing weather pattern. The MFMS 146a may provide the rerouter 146 with specific fuel consumption or projected flight time details associated with the new route, or plot a detailed trajectory for the aircraft 102 that corresponds to the new route. The rerouter 146 may submit a potential modification to the FMS or aircraft avionics 110 for crosschecking and approval. In applying the constraint set associated with the flight plan of the aircraft 102 to situation models generated by the situation modeler 136, the rerouter 146 may determine weight or cost factors for each constraint of the ordered constraint set associated with the current flight plan of the aircraft 102. For example, short-term turbulence may be tolerated to avoid a lengthy reroute or if a reroute is impossible due to hard factors such as terrain. Formulating a reroute to modify a flight plan may consider, for example, whether approval must be sought to overfly a military operations area to avoid a longer reroute, or whether the traffic patterns of other aircraft 104 indicate clear paths for the aircraft 102. The rerouter 146 may generate a revised or new flight plan based on applying a constraint set to situation models. The new flight plan may include one or more hazard conflicts presented to the pilot or crew with the new flight plan for approval (via the display unit 142 of the onboard FARM device 108), as well as an ACARS recall code for implementation. Should the pilot or crew approve the new flight plan, the new flight plan may be implemented by submitting the associated ACARS recall code to the flight management system and aircraft avionics 110 of the aircraft 102.

The rerouter may submit a potential modification to a ground-based device 106 (via the communications/IP networks 120) for crosschecking and approval by ground control resources 116. A ground-based FARM device 106 may include one or more rerouters (not shown) for generating modifications to the flight plans of multiple aircraft in contact with the associated ground control resources 116. Ground-based rerouters may submit modifications for crosschecking by the ground control resources 116 and submit approved modifications to the onboard FARM devices 108, 114 aboard the associated aircraft 102, 104 for implementation. In one embodiment, a ground-based FARM device 106 may receive localized data from one or more aircraft 102, 104 via the communications/IP networks 120. The situation modeler 140 of the ground-based FARM device 106 may generate multiple situation models corresponding to each aircraft 102 by fusing instances of individually localized data with cloud-based data and data patterns incorporating information generated from other aircraft 104. The situation modeler 140 may generate multiple flight plan modifications and rationales associated with each modification, storing the resulting modifications and rationales rather than submitting modifications for crosschecking or implementing proposed modifications via their respective aircraft 102, 104. In this way the FARM system 100 can analyze the performance of the system as a whole as well as individual flight plan modification algorithms based on historical data.

Figure 2A:
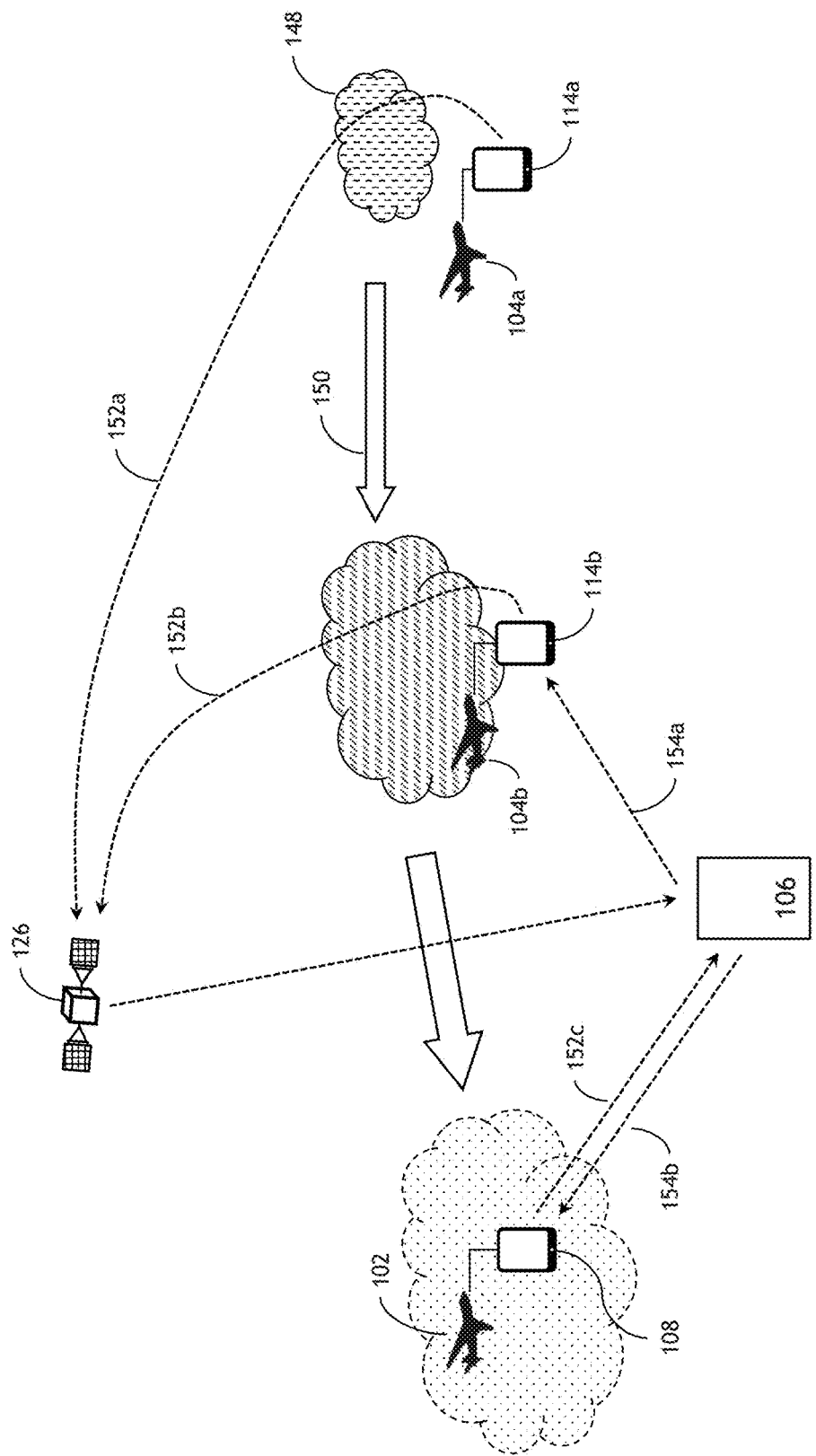
FIGS. 2A and 2B are environmental diagrams of a FARM system according to embodiments of the inventive concepts disclosed herein.
Figure 2B:
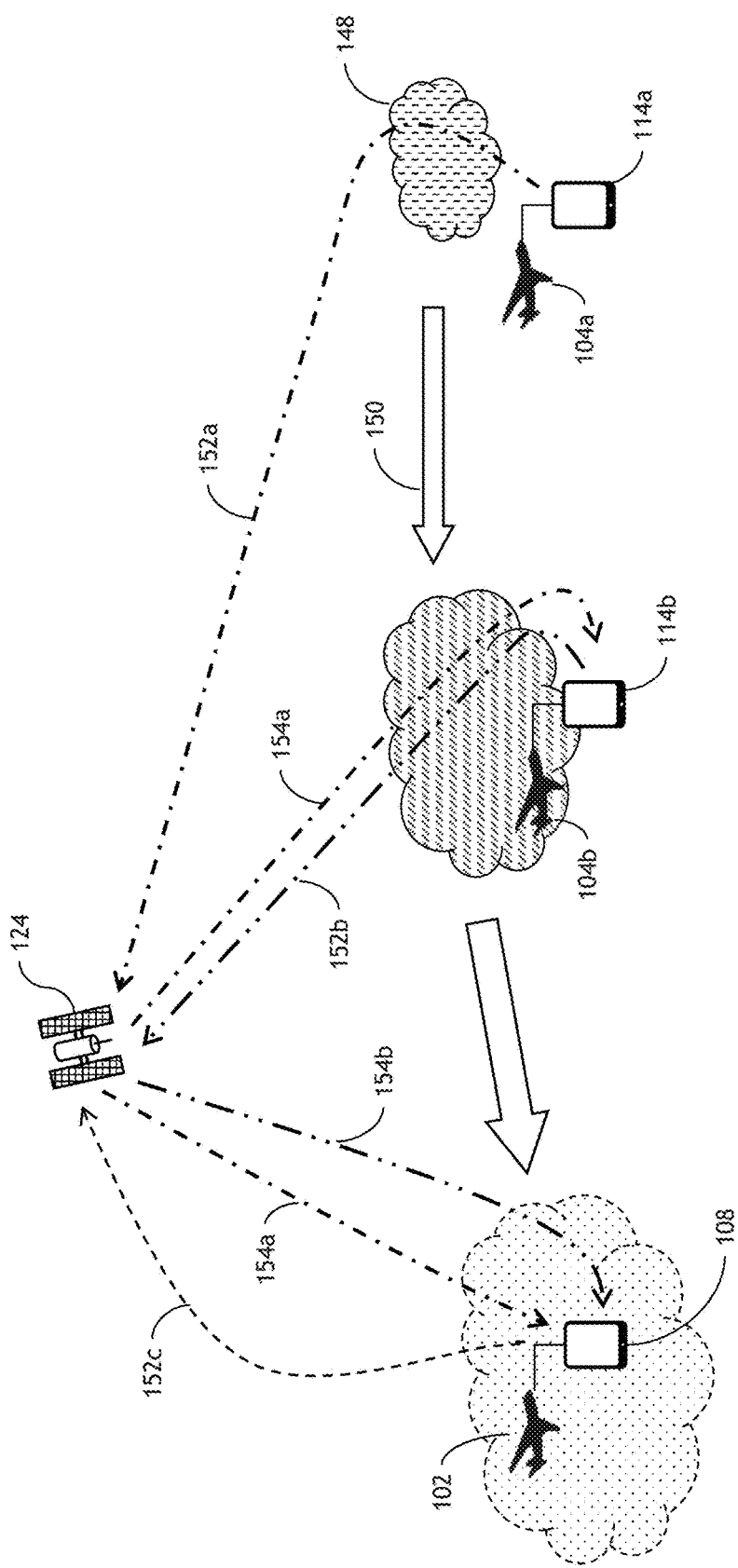

Referring also to FIGS. 2A and 2B, a FARM system 100 distributed among ground-based FARM devices 106 and airborne FARM devices 108, 114 may generate predictive weather models based on data points collected at multiple points in time along multiple vectors corresponding to the flight paths of aircraft 102, 104 as the aircraft 102, 104 move relative to developing weather and atmospheric systems. For example, referring to FIG. 2A, aircraft 104a may fly through an airspace, soon followed by aircraft 104b flying a similar route, as a storm system 148 develops along a course 150 nearly opposite to the flight path of aircraft 104a, 104b. Weather sensors (not shown) aboard the aircraft 104a may note the storm system 148 as relatively small yet intense, characterized by rain, lower visibility, higher winds, or higher turbulence. The onboard FARM device 114a aboard the aircraft 104a may relay (152a) localized weather observations to a ground-based FARM device 106 via a LEO satellite-based network 126. When the storm system 148 intersects with the flight path of the trailing aircraft 104b, the onboard FARM device 114*b* aboard the aircraft 104*b* may have received (154*a*) updated weather information from the ground-based FARM device 106 including the observations of the aircraft 104*a*. The weather sensors 112*b* (not shown) aboard aircraft 104*b* may, for example, observe the storm system 148 in a new location, somewhat larger in size but less intense than previously observed. The onboard FARM device 114*b* may relay (152*b*) its localized weather observations to the ground-based FARM device 106 via the LEO satellite-based network 126. The FARM system 100 may combine the localized weather observations of the aircraft 104*a* and 104*b*; based on these localized observations, the FARM system 100 (via ground-based FARM device 106) may generate a model of the storm system 148 that predicts where the aircraft 102 will likely encounter the storm system 148 (based on the current flight path of the aircraft 102) and the conditions the aircraft 102 is likely to expect; for example, that the storm system 148 is likely to have grown in size but dissipated in intensity when encountered by the aircraft 102. The FARM system may forward (154*b*) this predictive weather model to the onboard FARM device 108 aboard the aircraft 102. The onboard FARM device 108 may use the predictive weather model of the storm system 148 to build situation models along its flight path and determine whether the constraint set governing the flight of the aircraft 102 suggests alerting the crew or modifying the flight plan of the aircraft 102 based on the conditions presented by the storm system 148. The onboard FARM device 108 aboard the aircraft 102 may relay (152*c*) back to the FARM system 100 its own localized weather data collected by the weather sensors (not shown) aboard the aircraft 102.

The FARM system 100 may increase synchronization of data between onboard FARM devices 108, 114 aboard aircraft 102, 104, allowing the aircraft 102, 104 and ground control resources 116 to share information and situation models in real-time or near real-time by routing data communications through a low-latency LEO satellite-based network 126. In this way the onboard FARM devices 108, 114 aboard individual aircraft 102, 104 of the FARM system 100 may require fewer onboard processors 136, instead relying on the ground-based situation modelers 140 of ground-based FARM devices 106 to generate comprehensive and predictive traffic and weather models and propagate the models, and modifications based on those models, throughout the FARM system 100 at high data rates.

In some embodiments, the FARM system 100 may reduce intra-component communications latency and increase effective data synchronization between aircraft by relying on peer-to-peer satellite-based communications links between the onboard FARM devices 108, 114 aboard aircraft 102, 104. For example, referring to FIG. 2B, aircraft 104*a* and trailing aircraft 104*b* and 102 may be following flight plans through substantially the same airspace at different points in time. The aircraft 104*a* and trailing aircraft 104*b* and 102 may be following transoceanic flight plans over long stretches of open water, where ground control resources 116 may not be available. As the aircraft 104*a* passes through the path (150) of developing storm system 148, its onboard weather sensors (not shown) collect localized weather data for the onboard FARM device 114*a*. The onboard FARM device 114*a* may then pass (152*a*) weather data local to the aircraft 104*a* to the trailing aircraft 104*b* and 102, using the geostationary satellite network 124 as a relay point.

On receiving (154*a*) the localized weather data from the aircraft 104*a*, the onboard FARM device 114*b* aboard trailing aircraft 104*b* may generate a situation model predictive of the location, time, or conditions under which the trailing aircraft 104*b* may encounter the storm system 148. The onboard FARM device 114*b* may relay (152*b*) its own localized weather data collected from the weather sensors (not shown) aboard the aircraft 104*b* to the aircraft 102, trailing both aircraft 104*a* and 104*b*. The onboard FARM device 108 aboard aircraft 102, trailing both aircraft 104*b* and 104*a*, may receive (154*a*, 154*b*) localized weather data from both aircraft 104*a*, 104*b* (or curated weather data from multiple aircraft 104 via a ground-based source), and generate a situation model that more accurately and more confidently represents the conditions under which the aircraft 102 may encounter the storm system 148. In other words, the situation model generated by the onboard FARM device 108 may model the storm system 148 with a lower uncertainty factor than did onboard FARM devices 114*b* and 114*a*. The situation model generated by the onboard FARM device 108 may determine with greater accuracy whether the flight plan of the aircraft 102 should be modified as a result of the storm system 148 (depending upon the ordered constraint set governing the flight plan of the aircraft 102). The onboard FARM device 108 aboard the aircraft 102 may relay to other aircraft (152*c*) its own localized weather data collected by the weather sensors (not shown) aboard the aircraft 102. Any aircraft trailing the aircraft 102, or passing through or near the path (150) of the storm system 148, may add the local observations of the aircraft 102 to the local observations of aircraft 104*a*, 104*b* (as well as the aircraft's own localized weather observations) to generate detailed and high-certainty predictive models of the storm system 148 and the airspace in its path.

Figure 3:
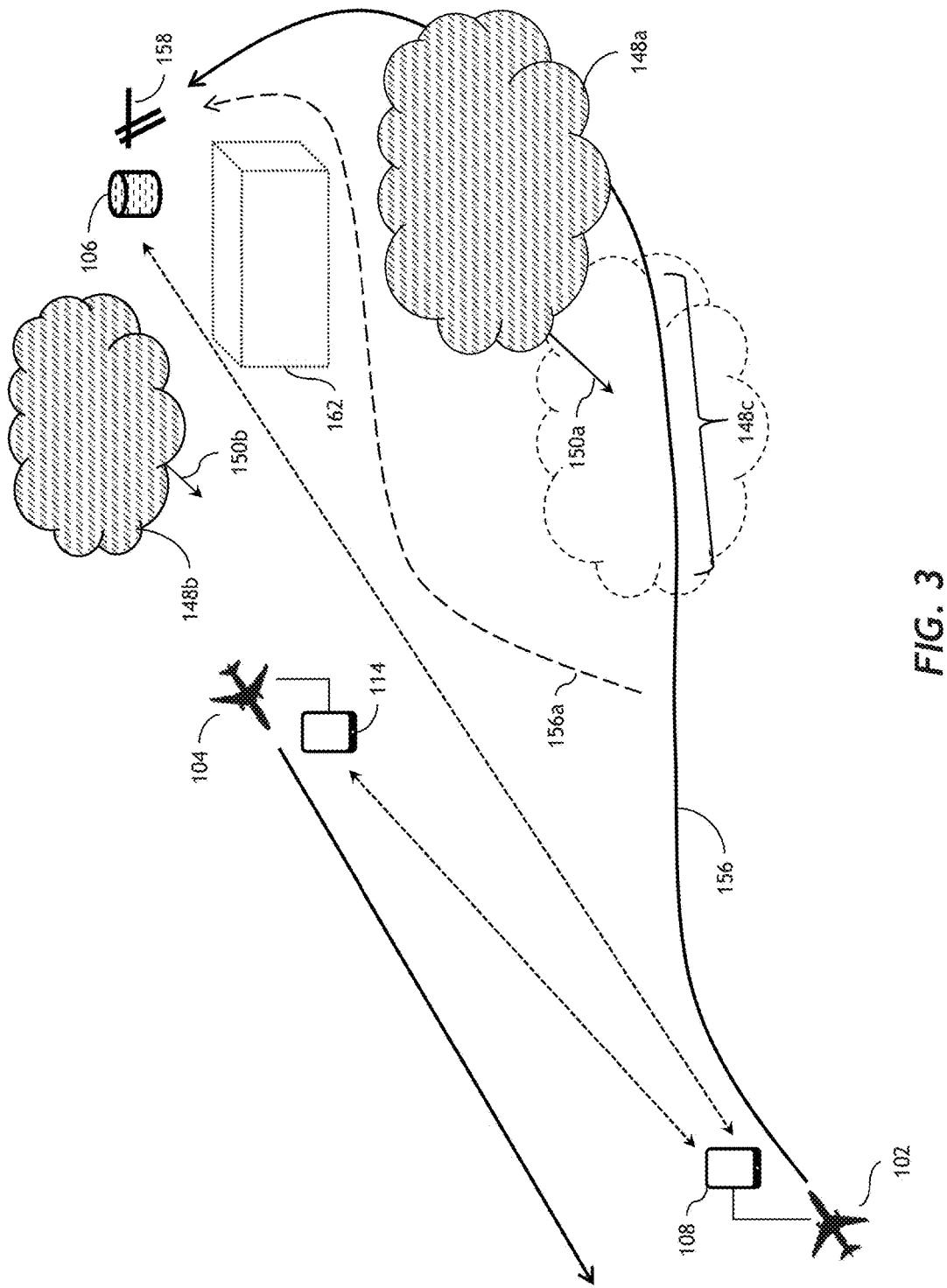
FIG. 3 is an environmental diagram of a flight and route management (FARM) system according to embodiments of the inventive concepts disclosed herein.

Referring to FIG. 3, the onboard FARM device 108 of the aircraft 102 may continually generate situation models based on any available localized and cloud-based data, assessing the progress of the aircraft 102 throughout its flight plan based on the criteria provided by its ordered constraint set and determining whether any modifications should be made to the flight plan. For example, the flight plan of the aircraft 102 may provide that the aircraft 102 follow a flight path 156 toward a landing at an airport 158. The onboard FARM device 108 may generate situation models along its flight path based on localized observations and cloud-based data received (160) from the ground-based FARM device 106 based at or near the airport 148. For example, data received from the ground-based FARM device 106 may include traffic data at or around the airport 158, details on the location and potential movement (150*a*, 150*b*) of storm systems 148*a* and 148*b*, and information about a prohibited airspace 162 which the aircraft 102 is directed to avoid. The prohibited airspace 162 may represent, for example, a no-fly zone imposed by ground authorities, a temporarily restricted airspace, or an airspace subject to excessive overflight fees. The onboard FARM device 108 may receive (154) additional localized data about the movement of storm system 148*b* from the onboard FARM device 114 aboard the aircraft 104, which follows a flight path that enables weather sensors aboard the aircraft 104 to track the storm system 148*b* as it develops (150*b*). The onboard FARM device 108 may generate situation models that show an increasing probability (as more data points relevant to the storm system 148*a* are acquired) that the storm system 148*a* will intersect (148*c*) the flight path 156 of the aircraft 102 such that the flight path may travel directly through the storm system 148*a* for an extended period.

Depending on the current set of ordered constraints imposed upon the flight plan of the aircraft 102 by the FARM system 100, the onboard FARM device 108 may determine a modification to the flight path of the aircraft 102 including a new flight path 156a to the airport 158. For example, if the constraint set ranks fuel consumption, minimal distance, or minimal flight time higher than passenger comfort, and the storm system 148a is not expected to result in turbulence or atmospheric conditions that are dangerous or damaging to the aircraft 102a or its passengers (ex.—low level of risk), the onboard FARM device 108 may determine that no modification is necessary, and that the aircraft 102 should continue along its current flight path 156 pending future developments. The onboard FARM device 108 may alert the pilot and crew of the aircraft 102, the ground-based FARM device 106, or any other aircraft 104 in the area of potential turbulence due to the storm system 148a.

If, however, the constraint set prioritizes passenger comfort over economic considerations, or the storm system 148a is determined to be severe or potentially severe in nature (among other relevant factors), the onboard FARM device 108 may generate a potential modification to the flight plan of the aircraft 102a. The potential modification may include a revised flight path 156a that avoids the expected path of the storm system 148a (but may minimize the use of extra fuel where possible, if cost considerations are a lower priority). The potential modification may additionally rely on assessments of the path of the storm system 148b (as relayed by the ground-based FARM device 106 and the aircraft 104) to steer clear of any future paths the storm system 148b may take. The potential modification may note the prohibited airspace 162, and generate a flight plan that steers the aircraft 102 away from the prohibited airspace 162. The potential modification may include targeting a different runway or approach vector to the airport 158 than originally intended. In some embodiments, the onboard FARM device 108 may pass a generated situation model along with local data to the ground-based FARM device 106, which may generate a potential modification to the flight plan of the aircraft 102 and relay the modification to the aircraft 102 after crosschecking. The onboard FARM device 108 or the ground-based FARM device 106 may generate a rationale along with a flight plan modification, concisely explaining the reasons for the potential modification.

While generating a flight plan modification, a FARM device of the FARM system 100 (whether an onboard FARM device 108 or a ground-based FARM device 106) may redefine the constraint set applicable to a given flight plan or a given aircraft, and generate a potential modification by applying the new constraint set to the current flight plan and local/cloud-based data streams. Revision of a constraint set by the FARM system 100 may occur due to local or regional emergency conditions or if business reasons dictate a sudden change in priorities. For example, the ground-based situation modeler 140 may reorder the prioritized constraints of a constraint set. For example, passenger comfort and safety may be reprioritized above fuel conservation and cost factors, resulting in a more likely modification of the flight path 156 of the aircraft 102 to a less turbulent flight path 156a. In the alternative, a constraint set may be revised by the addition of a new constraint or the removal of an existing constraint from the list.

Figure 1B:
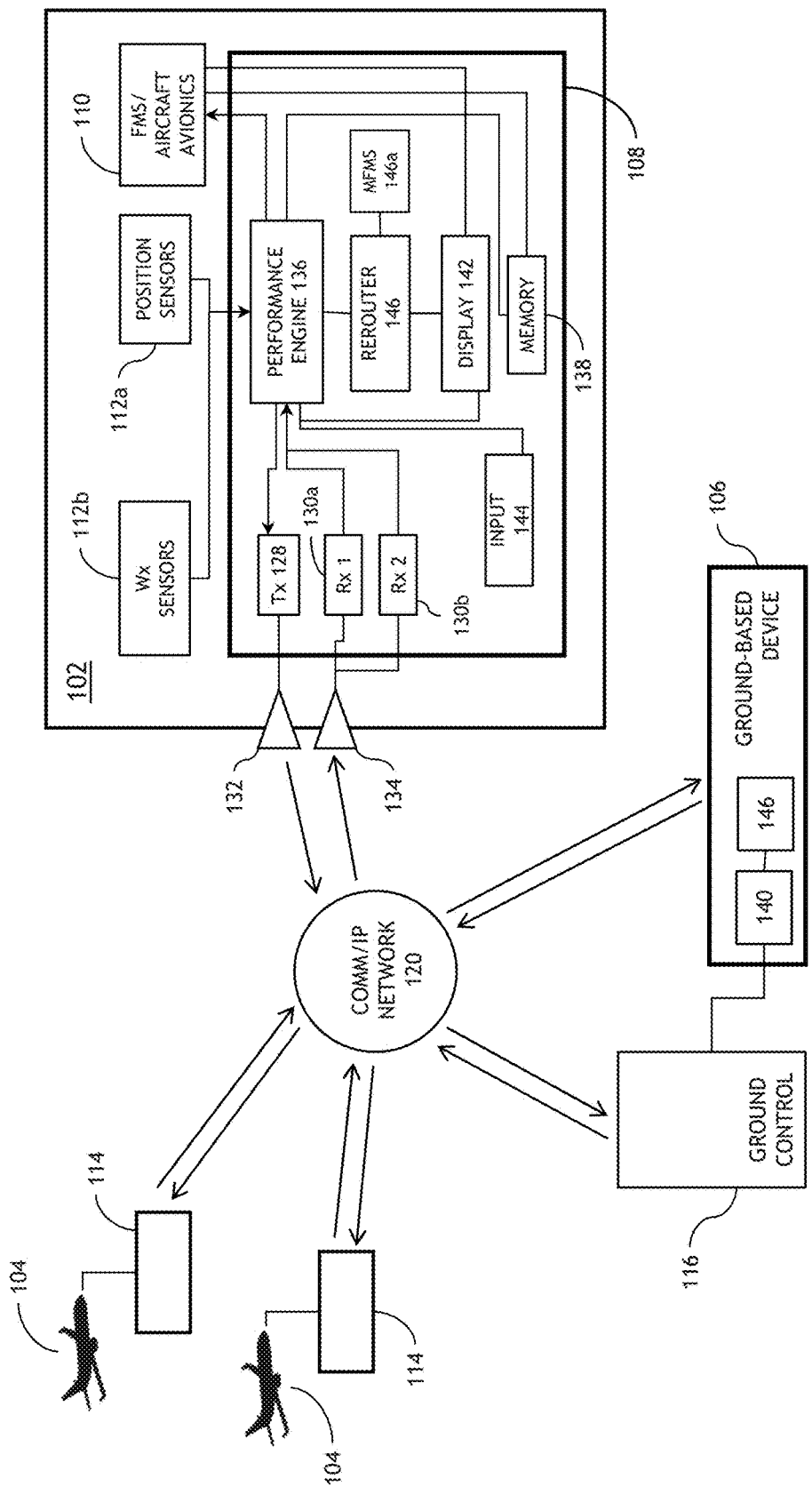
FIG. 1B is a block diagram of a FARM system according to embodiments of the inventive concepts disclosed herein.

Once the onboard FARM device 108 has generated a potential modification to the flight plan of the aircraft 102, the modification may be crosschecked with any local traffic data available to the onboard FARM device 108. The onboard FARM device 108 may display the potential modification to the pilot or crew of the aircraft 102 (via its display unit 142, as shown by FIG. 1B) for approval or cancellation (via its input device 144, as shown by FIG. 1B), along with a rationale concisely explaining the reasons for the modification. The onboard FARM device 108 may forward a potential modification to the ground-based FARM device 106 (adjacent to control facilities at the airport 158) for crosschecking and approval. On approval of a potential flight plan modification, the onboard FARM device 108 may display the flight plan modification (via its input device 144, as shown by FIG. 1B) to the pilot or crew of the aircraft 102 for manual implementation. The onboard FARM device 108 may automatically implement a flight plan modification via direct link to the avionics components 110 (as shown by FIG. 1B) of the aircraft 102. Once a modification to the flight plan of the aircraft 102 has been approved for implementation, the onboard FARM device 108 aboard the aircraft 102 may notify the ground-based FARM device 106 and the onboard FARM devices 114 aboard other aircraft 104 of the flight plan modification. The ground-based FARM device 106 may propagate the flight plan modification to other ground resources 116 and aircraft 104 throughout the FARM system 100.

Figure 4:
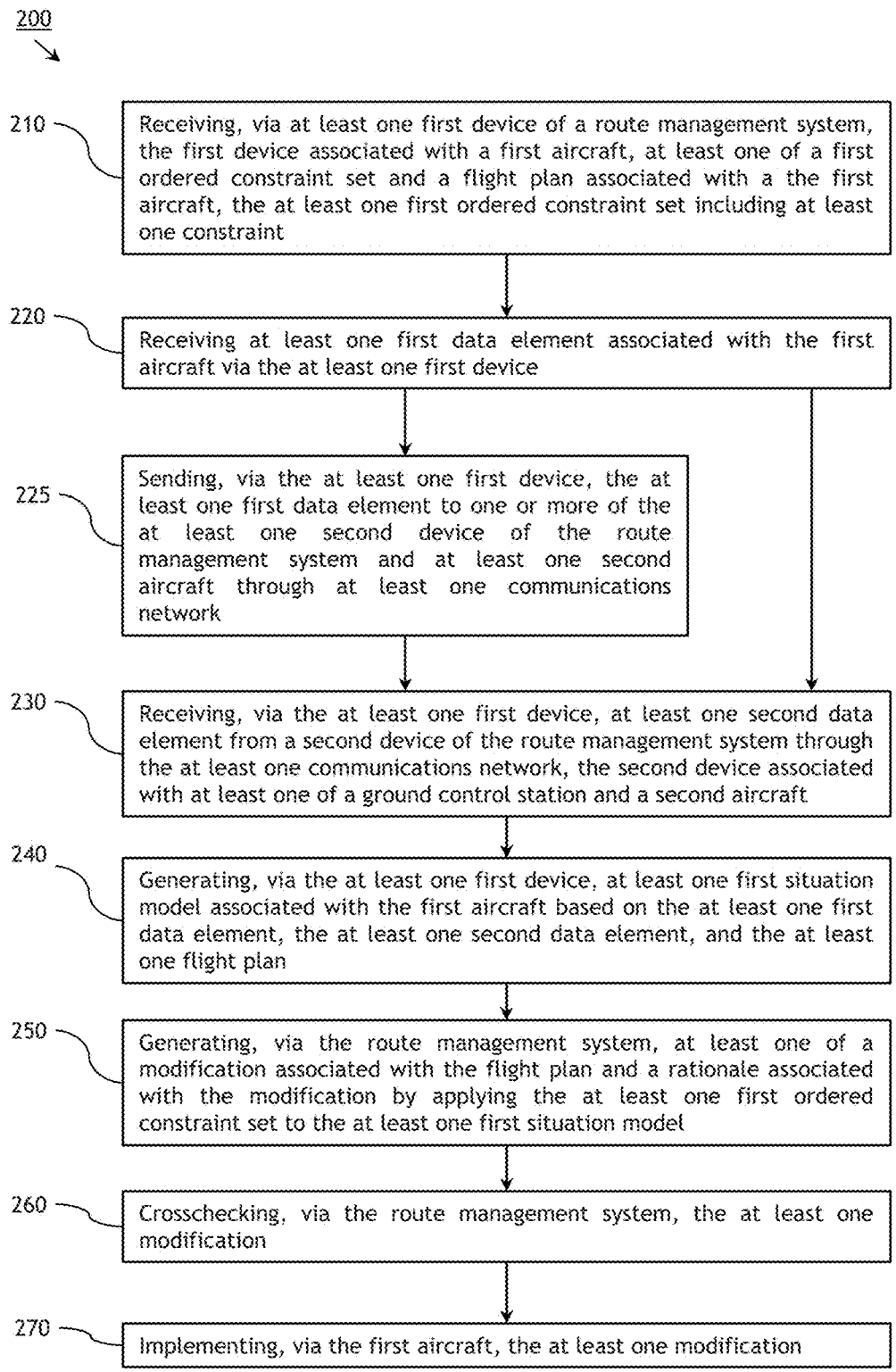
FIG. 4 is a process flow diagram illustrating a method according to embodiments of the inventive concepts disclosed herein.

FIG. 4 illustrates a method 200 for distributed flight and route management according to embodiments of the inventive concepts disclosed herein. At a step 210, an onboard FARM device 108 (aboard a first aircraft 102) of a flight and route management (FARM) system 100 receives a first ordered constraint set and a flight plan associated with the first aircraft 102, the first ordered constraint set including at least one constraint. For example, the onboard FARM device 108 may receive one or more of a mission profile, a mission objective, a risk level, a safety factor, a cost factor, a comfort factor, a terrain factor, a traffic directive, a weather hazard, a time requirement, or a business rule.

At a step 220, the onboard FARM device 108 receives at least one data element local to (ex.—associated with) the first aircraft 102. For example, the onboard FARM device 108 may receive local weather data via a weather sensor 112b of the first aircraft or local position data via a position sensor 112a of the first aircraft.

The method 200 may include an additional step 225. At a step 225, the onboard FARM device 108 sends the localized data to at least one of a ground-based FARM device 106 and an onboard FARM device 114 aboard a second aircraft 104 through a communications/IP network 120. For example, the onboard FARM device 108 may send the localized data via a ground-based IP network 122, an Aircraft Communications Addressing and Reporting System (ACARS) network, a geostationary satellite-based network 124, and a low-earth-orbit (LEO) satellite-based network 126.

At a step 230, the onboard FARM device 108 receives at least one cloud-based data element associated with at least one second aircraft 104 from a ground-based FARM device 106 (or an onboard FARM device 114 of the aircraft 104) through the communications/IP network 120. For example, the onboard FARM device 108 may receive an element of weather data local to the second aircraft 104, a weather radar image, a regional weather model, a predictive weather model having an uncertainty level, a severe weather model, a modified flight plan associated with the second aircraft 104, an air traffic report, an ADS-B message, and a Notice to Airmen (NOTAM) through the communications network 120.

At a step 240, the situation modeler 136 of the onboard FARM device 108 generates a situation model associated with the first aircraft 102 based on the localized data elements, the received cloud-based data elements, and the flight plan of the aircraft 102.

At a step 250, a FARM device 108/114 of the FARM system 100 generates a modification associated with the flight plan and a rationale associated with the modification by applying the first ordered constraint set to the current situation model. For example, the rerouter 146 of the onboard FARM device 108 aboard the aircraft 102 may generate a first modification, or a first rationale associated with the first modification by applying the first ordered constraint set to the situation model. The rerouter 146 of the ground-based FARM device 106 may generate a second situation model based on the localized data received from the aircraft 102 and current cloud-based data received from other aircraft 104 or a cloud network associated with a ground resource 116 of the FARM system 100. The situation modeler 140 may generate a modified constraint set based on the original ordered constraint set associated with the flight plan of the aircraft 102 by adding or deleting a constraint of the set or reordering existing constraints. The rerouter 146 may generate a second modification by applying the modified constraint set to the second situation model generated by the situation modeler. The situation modeler 140 of the ground-based FARM device 106 may send the second modification and a second rationale for the modification to the aircraft 102 via the communications/IP networks 120. The rerouter 146 may generate a revised or new flight plan including one or more hazard conflicts and an ACARS recall code and display the new flight plan and hazard conflicts to the crew via the display unit 142 of the onboard FARM device 106. Once the new flight plan has been crosschecked and approved by ground control resources 116, the crew may implement the new flight plan by submitting the associated ACARS recall code to the flight management system and aircraft avionics 110 of the aircraft 102.

At a step 260, the FARM system 100 crosschecks the modification. For example, the onboard FARM device 108 may send a modification generated by the situation modeler 136 and the rerouter 146 to either the onboard avionics 110 or a ground-based FARM device 106 for crosscheck and approval. The onboard avionics 110 or the ground-based FARM device 106 may generate a notification of the successful crosscheck or approval, which the display unit 142 of the onboard FARM device 108 may display to the pilot or crew.

At a step 270, the aircraft 102 implements the modification. For example, the onboard FARM device 108 may display (via its display unit 142) the modification and the associated rationale to a pilot or crewmember of the aircraft 102. The onboard FARM device 108 may forward the modification for automatic implementation by the FMS or avionics aboard the aircraft 102.

While particular aspects of the inventive concepts disclosed herein have been shown and described, it will be apparent to those skilled in the art that, based upon the teachings herein, changes and modifications may be made without departing from the scope of the inventive concepts disclosed herein and their broader aspects and, therefore, the appended claims are to encompass within their scope all such changes and modifications as are within the broad scope of the inventive concepts disclosed herein.

We claim:

1. An apparatus for managing at least one flight plan, the apparatus comprising:
    at least one transceiver configured to connect to communications network, the at least one transceiver including transmitter and one or more receivers;
    at least one memory configured to store at least one of 1) a flight plan associated with a first aircraft, 2) a mission profile associated with the flight plan, and 3) a sequence of one or more constraints associated with the mission profile, the sequence of one or more constraints including at least one of passenger comfort, customized business rules, and specific mission objectives;
    at least one processor coupled to the transceiver and the memory, and couplable to at least one of an avionics component of the first aircraft and a sensor of the first aircraft, the at least one processor comprising:
        a situation modeler configured to
            receive at least one of first weather data and position data from at least one of the avionics component and the sensor;
            receive at least one of second weather data and traffic data from an external source via the transceiver;
            generate at least one situation model based on at least one of the first weather data, the position data, the traffic data, the second weather data, and the flight plan; and
        at least one rerouter coupled to the situation modeler and configured to generate, based on the at least one situation model and the sequence of one or more constraints, at least one of a modification associated with the flight plan and rationale associated with the modification; and
            display one or more of the at least one modification and the at least one rationale via at least one display unit coupled to the at least one processor.

2. The apparatus of claim 1, wherein the at least one external source includes at least one of a second aircraft, a ground control station, a cloud-based source, a weather station, or a weather source.

3. The apparatus of claim 1, wherein the at least one communications network includes at least one of a ground-based IP network, an Aircraft Communications Addressing and Reporting System (ACARS) network, a geostationary satellite-based network, and a low-earth-orbit (LEO) satellite-based network.

4. The apparatus of claim 1, wherein the flight plan is a first flight plan, and:
    the second weather data includes at least one of weather data local to at least one third aircraft, a weather radar image, a regional weather model, a predictive weather model having an uncertainty level, and a severe weather model;
    the traffic data includes at least one of a second flight plan associated with the at least one third aircraft, an air traffic report, an ADS-B message, and a Notice to Airmen (NOTAM); and
    the at least one constraint is associated with one or more of a level of risk, a cost factor, a comfort factor, a mission objective, a business rule, a traffic directive, a time requirement, an uncertainty level, and a weight factor.

5. The apparatus of claim 1, wherein:
    the at least one modification is associated with at least one of a hazard conflict and a recall code.

6. The apparatus of claim 1, wherein the rerouter includes at least one mirror flight management system (FMS) couplable to the at least one avionics component and configured to generate at least one of a time factor associated with the at least one modification, a fuel consumption factor associated with the at least one modification, and a trajectory associated with the at least one modification.

7. The apparatus of claim 1, further comprising:
    at least one RFID tag configured to securely identify the apparatus to the route management system.

8. The apparatus of claim 1, wherein the sequence of one or more constraints is a sequence of one or more first constraints, and the situation modeler is configured to modify the sequence of one or more first constraints by at least one of:
  adding at least one second constraint to a predetermined position in the sequence of one or more first constraints;
  deleting the at least one first constraint from the sequence of one or more first constraints; and
  reordering the one or more first constraints.

9. The apparatus of claim 1, wherein the situation modeler is configured to forward the at least one modification to one or more of the avionics components and the external source.

10. A distributed system for managing flight plans, the system comprising:
  at least one of a first device associated with a first aircraft and at least one second device associated with a ground control station, the at least one first device and the at least one second device couplable by at least one communications network, the at least one first device comprising:
    a first transceiver wirelessly couplable to the communications network, the first transceiver including at least one of a first transmitter and a first receiver;
    at least one first memory configured to store at least one of 1) a flight plan associated with the first aircraft, 2) a mission profile associated with the flight plan, and 3) a sequence of one or more constraints associated with the mission profile, the sequence of one or more constraints including at least one of passenger comfort, customized business rules, and specific mission objectives; and
    at least one first processor coupled to the first transceiver and the first memory, the at least one first processor comprising:
      a first situation modeler configured to:
        1) receive at least one of position data and first weather data from at least one of a sensor of the first aircraft and an avionics component of the first aircraft;
        2) receive at least one of traffic data and second weather data from the second device via the communications network; and
        3) generate at least one first situation model based on at least one of the position data, the first weather data, the traffic data, the second weather data, and the at least one flight plan; and
      a first rerouter configured to:
        generate, based on the at least one situation model and the sequence of one or more constraints, at least one of a first modification associated with the flight plan and a first rationale associated with the first modification; and
        display the at least one of a first modification and a first rationale via a first display unit coupled to the at least one first processor; and
  the at least one second device comprising:
    a second transceiver couplable to the communications network and including at least one of a second transmitter and a second receiver;
    at least one second processor coupled to the second transceiver and comprising:
      a second situation modeler configured to:
        1) generate at least one of the flight plan, the mission profile, and the sequence of one or more constraints;
        2) send one or more of the flight plan, the mission profile, the sequence of one or more constraints, the traffic data, and the second weather data to the at least one first device via the second transceiver;
        3) receive one or more of the first modification, the position data, and the first weather data from the at least one first device via the second transceiver;
        4) receive one or more of the traffic data and the second weather data from one or more of a second aircraft and the ground control station via the second transceiver;
        5) generate a second situation model associated with the at least one first aircraft based on at least one of the position data, the first weather data, the traffic data, the second weather data, and the flight plan; and
      a second rerouter configured to:
        1) generate, based on the at least one second situation model and the sequence of one or more constraints associated with the at least one first aircraft, at least one of a second modification associated with the flight plan and a second rationale associated with the second modification;
        2) crosscheck at least one of the first modification and the second modification; and
        3) send to the first device at least one of the first modification and the second modification via the second transceiver.

11. The system of claim 10, wherein the sequence of one or more constraints is a sequence of one or more first constraints, and the at least one second situation modeler is configured to:
  modify the at least one sequence of one or more constraints at least one to:
    1) adding at least one second constraint to the sequence of one or more constraints;
    2) removing at least one first constraint from the sequence of one or more constraints; and
    3) reordering the one or more first constraints.

12. A method for distributed flight and route management, the method comprising:
  receiving, via at least one first flight and route management (FARM) device of a route management system, at least one of a flight plan associated with a first aircraft and a mission profile associated with the flight plan, the mission profile including at least one sequence of one or more constraints, the at least one sequence of one or more constraints including passenger comfort, customized business rules, and specific mission objectives;
  receiving at least one of first weather data and position data associated with the first aircraft via the at least one first FARM device;
  receiving, via the at least one first FARM device, at least one of traffic data and second weather data from at least one second device of the route management system through a communications network, the second device associated with at least one of a ground control station and a second aircraft;
  generating, via the at least one first FARM device, at least one situation model associated with the first aircraft based on at least one of the position data, the first weather data, the traffic data, the second weather data, and the at least one flight plan;
  generating, via the route management system, at least one of a modification associated with the flight plan and a rationale associated with the modification, based on the at least one sequence of one or more constraints and the at least one situation model;

crosschecking, via the route management system, the at least one modification; and implementing, via the first aircraft, the at least one modification.

13. The method of claim 12, wherein:

receiving at least one of first weather data and position data associated with the first aircraft via the at least one first FARM device includes receiving at least one of first weather data and position data associated with the first aircraft via at least one of a sensor of the first aircraft and an avionics component of the first aircraft; and receiving, via the at least one first FARM device, at least one of traffic data and second weather data from at least one second device of the route management system through a communications network, the second device associated with at least one of a ground control station and a second aircraft includes receiving, via the at least one first device, at least one of a weather radar image, a regional weather model, a predictive weather model having an uncertainty level, a severe weather model, weather data local to the second aircraft, a modified flight plan associated with the at least one second aircraft, an air traffic report, an ADS-B message, and a Notice to Airmen (NOTAM) from a second device of the route management system through the communications network.

14. The method of claim 12, wherein implementing, via the first aircraft, the at least one modification includes:

forwarding the at least one of a modification and a rationale to one or more of a display unit of the at least one first FARM device, an avionics component of the first device, and the second device.

15. The method of claim 14, wherein:

generating, via the route management system, at least one of a modification associated with the flight plan and a rationale associated with the modification, based on the at least one sequence of one or more constraints and the at least one situation model includes generating, via the route management system, at least one of a hazard conflict and a recall code based on the at least one sequence of one or more constraints and the at least one situation model; and implementing, via the first aircraft, the at least one modification, includes submitting the at least one recall code to the at least one avionics component via the first device.

16. The method of claim 12, wherein generating, via the route management system, at least one of a modification associated with the flight plan and a rationale associated with the modification, based on the at least one sequence of one or more constraints and the at least one situation model includes:

generating, via the route management system, at least one of a modification associated with the flight plan and a rationale associated with the modification, based on the at least one situation model and one or more of a level of risk, a cost factor, a weight factor, a comfort factor, a mission objective, a business rule, a traffic directive, a time requirement, and an uncertainty level.

17. The method of claim 12, further comprising:

sending, via the at least one first FARM device, the at least one of first weather data and position data associated with the first aircraft to the at least one second device through the communications network.

18. The method of claim 17, wherein the situation model is a first situation model and generating, via the route management system, at least one of a modification associated with the flight plan and a rationale associated with the modification, based on the at least one sequence of one or more constraints and the at least one situation model includes:

receiving, via the at least one first FARM device, at least one second situation model based on one or more of the position data, the first weather data, the traffic data, the second weather data, and the flight plan, the second situation model generated by the at least one second device.

19. The method of claim 18, wherein the sequence of one or more constraints is a sequence of one or more first constraints and generating, via the route management system, at least one of a modification associated with the flight plan and a rationale associated with the modification, based on the sequence of one or more constraints and the at least one situation model includes:

generating, via the at least one second device, at least one modified sequence of one or more constraints by at least one of
1) adding at least one second constraint to a predetermined position in the at least one sequence of one or more constraints;
2) deleting at least one first constraint from the at least one sequence of one or more constraints; and
3) reordering the one or more first constraints.

20. The method of claim 17, wherein the modification is a first modification, the rationale is a first rationale, and generating, via the route management system, at least one of a modification associated with the flight plan and a rationale associated with the modification, based on the sequence of one or more constraints and the at least one situation model includes:

receiving, via at least one first FARM device, at least one of a second modification associated with the flight plan and a second rationale associated with the second modification, the second modification and the second rationale generated by the at least one second device based on the sequence of one or more constraints and at least one of the first situation model and the second situation model.

* * * * *